United States Patent [19]
Sasaki et al.

[11] Patent Number: 5,820,516
[45] Date of Patent: Oct. 13, 1998

[54] AUTOMATIC TRANSMISSION CONTROL SYSTEM

[75] Inventors: Kazuo Sasaki; Minoru Kuriyama, both of Hiroshima, Japan

[73] Assignee: Mazda Motor Corporation, Japan

[21] Appl. No.: 731,113

[22] Filed: Oct. 9, 1996

[30]   Foreign Application Priority Data

Oct. 11, 1995   [JP]   Japan .................................. 7-290497

[51] Int. Cl.⁶ .................................................. F16H 61/00
[52] U.S. Cl. ........................ 477/109; 477/107; 477/110
[58] Field of Search .................................. 477/107, 109, 477/110, 120, 904

[56]             References Cited

U.S. PATENT DOCUMENTS

| 5,433,676 | 7/1995 | Abe et al. ................................ 477/109 |
| 5,445,577 | 8/1995 | Fujita et al. ............................ 477/120 |
| 5,468,196 | 11/1995 | Minowa et al. ..................... 477/107 X |
| 5,499,953 | 3/1996 | Hayasaki ................................. 477/120 |
| 5,638,271 | 6/1997 | White et al. ........................ 477/107 X |
| 5,667,457 | 9/1997 | Kuriyama et al. ...................... 477/156 |

FOREIGN PATENT DOCUMENTS 5-43528   7/1993   Japan .

*Primary Examiner*—Charles A. Marmor
*Assistant Examiner*—Peter T. Kwon
*Attorney, Agent, or Firm*—Sixbey, Friedman, Leedom & Ferguson, P.C.; Gerald J. Ferguson, Jr.; Tim L. Brackett, Jr.

[57]              ABSTRACT

An automatic transmission control system, during a down shift, translates practical input speed to an transmission into a restrained input speed defined by a specific relationship which presents a difference between the practical and restrained input speeds greater when a changing rate of practical input speed is high as compared with when it is low, and forces an engine to continuously produce an output torque drop until the restrained input speed attains a specified speed level.

11 Claims, 6 Drawing Sheets

FIG. 2

| RANGE | GEAR | CLUTCH | | | | BRAKE | | ONE-WAY CLUTCH | |
|---|---|---|---|---|---|---|---|---|---|
| | | FORWARD (41) | COAST (42) | 3-4 (43) | REVERSE (44) | 2-4 (45) | LAW-REVERSE (46) | 1ST (51) | 2ND (52) |
| P | — | | | | | | | | |
| R | — | | | | ○ | | ○ | | |
| N | — | | | | | | | | |
| D | 1ST | ○ | | | | | | ○ | ○ |
| D | 2ND | ○ | | | | ○ | | ○ | |
| D | 3RD | ○ | ○ | ○ | | | | ○ | |
| D | 4TH | ○ | | ○ | | ○ | | | |
| S | 1ST | ○ | | | | | | ○ | ○ |
| S | 2ND | ○ | ○ | | | ○ | | ○ | |
| S | 3RD | ○ | ○ | ○ | | | | ○ | |
| L | 1ST | ○ | | | | | ○ | ○ | ○ |
| L | 2ND | ○ | ○ | | | ○ | | ○ | |

AUTOMATIC TRANSMISSION CONTROL SYSTEM

BACKGROUND OF THE INVENTION

1. Field of the Invention

The present invention relates to a control system for an automatic transmission, and more particularly, to an automatic transmission control system which employs torque down control executed during a down-shift.

2. Description of Related Art

Automatic transmissions for vehicles comprise transmission gear mechanisms and torque converters, Such an automatic transmission includes a plurality of friction coupling elements, such as brakes and clutches, which are selectively locked and unlocked to provide desired gears according to driving conditions and/or driver's demands. In order for automatic transmissions of this type to eliminate shift shock caused when friction coupling element is locked, torque down control where engine output torque is dropped is executed during a gear shift.

When the torque down control is executed during a down-shift, fluctuations of rotational speed of a turbine of the torque converter are caused due to torsional vibrations resulting from reaction of the friction coupling element, which always lead to aggravation of feeling of a satisfied gear shift. For this reason, it is desirable to continue the torque down control until such fluctuations have disappeared. For example, as taught in Japanese Patent Publication No. 5-43528, the torque down control during a down-shift is continued until a specified period of time has passed after a near conclusion of the down-shift.

A time necessary for fluctuations of turbine speed with torsional vibrations to disappear is not always constant and is different according to a changing rate of turbine speed during a gear shift. Specifically, the more rapid the change in turbine speed is, the longer the time becomes. As a result, as shown by way of example in FIG. 8, in cases where a time T1 until termination of the torque down control from, a near conclusion of a gear shift is shorter than a time T2 necessary for fluctuations of turbine speed to disappear, it becomes hard to certainly eliminate or reduce thee fluctuations. On the other hand, in cases where the time T1 is longer than the disappearance time T2, there is caused aggravation of acceleration performance after a conclusion of a gear shift.

SUMMARY OF THE INVENTION

It is an object of the invention to provide an automatic transmission control system which controls engine output torque during down shifts and, in particular, timely controls termination of a drop of engine output torque so as thereby to achieve a gear shift without being accompanied by aggravation of acceleration performance after a conclusion of the gear shift and yields a comfortable feeling of gear shift.

The above object of the invention is accomplished by providing a transmission control system which selectively activates friction coupling elements of an automatic transmission to change a power transmission path of the transmission gear mechanism so as thereby to place the automatic transmission into desired gears and execute torque down control during down shifts in which an engine causes a drop of output torque. The automatic transmission control system monitors a rate at which rotational speed input to the automatic transmission changes to a specified speed level, translates the input speed of rotation into a restrained speed of rotation which is defined by a specific relationship such that a difference between the input speed and restrained speed becomes greater as the speed changing rate increases, and forces the engine to continuously cause an output torque drop until the restrained rotational speed attains the specified speed level.

The specific relationship may defines the restrained rotational speed as an average rotational speed from a specified number of the latest input rotational speeds monitored at regular intervals.

Otherwise, the specific relationship may be given by the following expression:

$$Ntx(i) = a \cdot Nt(i) + b \cdot Nt(i-1)$$

where
  $Ntx(i)$ is the restrained input speed of rotation;
  $Nt(i)$ is the input speed of rotation monitored in the latest interval;
  $Ntx(i-1)$ is the input speed of rotation monitored in the previous interval; and
  $a$ and $b$ are constants and equal to the total of 1 (one).

In addition that the constants a and b are varied according to types of down shifts, it may be done to set the constant b to a value greater than the constant a for lower gears than for higher gears to which down shifts are made.

After a conclusion of a down shift, the engine gradually recover the drop of output torque to the ordinary level of output torque.

According to another embodiment of the invention, the automatic transmission control system monitors a changing rate of input rotational speed, and causes the engine to start recovery of the drop of output torque at a lapse of time from a conclusion of a down shift. The time is set to a value longer when a changing rate of input rotational speed is high as compared with when the changing rate of input rotational speed is low.

With the automatic transmission control system according to an embodiment of the invention, because the input speed is restrained greatly more when a changing rate of the input speed is higher than when it is lower, a delay in termination of the torque down control from a conclusion of a down shift, which depends upon a difference between the practical input speed and restrained input speed, or upon when the restrained input speed attains the specified speed level, becomes longer with an increase in the changing rate of input speed. Accordingly, there is no apprehensions that the torque down control terminates before disappearance of fluctuations of input speed or that the torque down control continues still after disappearance of fluctuations of input speed.

The relationship between practical input speed and restrained input speed always provides a difference between them which is greater when the changing rate is higher than when it is lower. This difference is differed according to types of down shifts. Specifically, the automatic transmission control system provides the delay which is longer for down shifts to lower gears where fluctuations of input speed need more longer time to disappear after a conclusion of the down shift than down shifts to higher gears.

With the automatic transmission control system according to another embodiment of the invention, setting the lapse of time from a conclusion of a down shift to a value longer when the changing rate of practical input speed is high as compared with when it is low eliminates apprehensions that the torque down control terminates before disappearance of fluctuations of input speed or that the torque down control continues still after disappearance of fluctuations of input speed.

BRIEF DESCRIPTION OF THE DRAWINGS

The above and other objects and features of the present invention will be clearly understood from the following description with respect to a preferred embodiment thereof when considered in conjunction with the accompanying drawings, in which:

FIG. 2 is a schematic block diagram showing a control system;

DETAILED DESCRIPTION OF THE PREFERRED EMBODIMENTS

Figure 1:
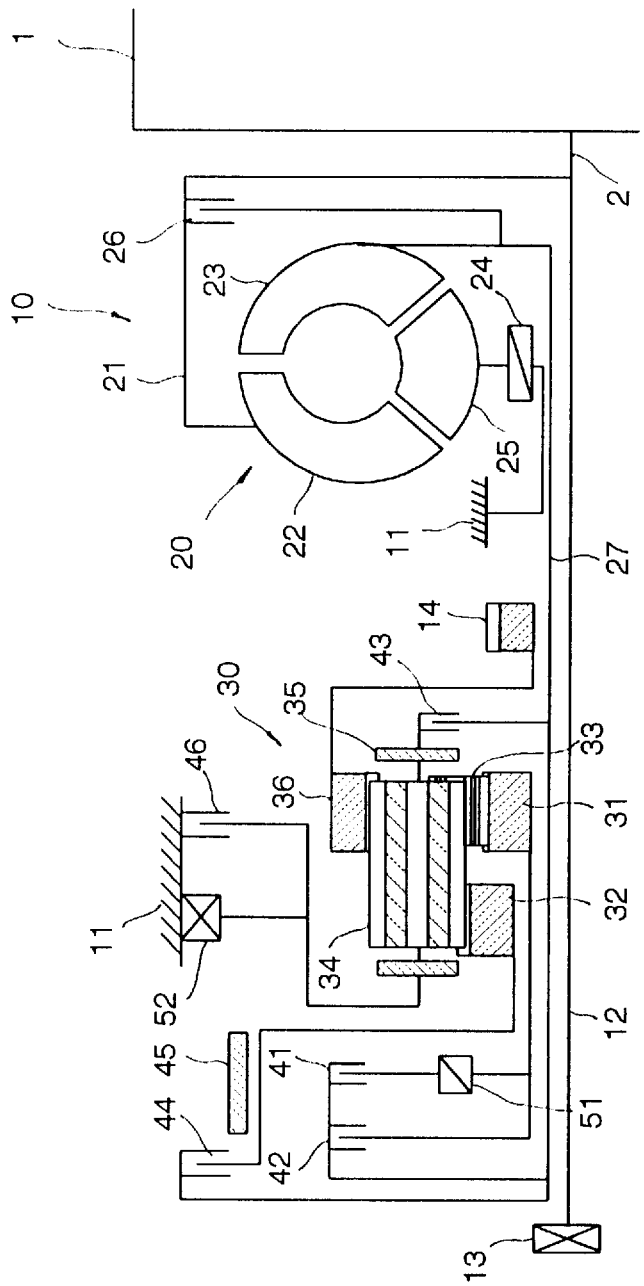
FIG. 1 is a skeleton diagram of an automatic transmission to which a transmission control system according to an embodiment of the invention is applied.

Referring to the drawings in detail, in particular, to FIG. 1 schematically showing an automatic transmission 10 controlled by a control system of the invention, torque from an engine 1 is transmitted to the automatic transmission 10 through an engine output shaft 2. Operation of the automatic transmission is controlled by a control unit 70 (shown in FIG. 3) comprising a microcomputer which incorporates a central processing unit (CPU), a read only memory (ROM) and a random access memory (ROM).

The automatic transmission 10 includes, in order from the engine GE, a torque converter 20 and a transmission gear mechanism 30 mounted coaxially with the output shaft 2 of the engine 1. The torque converter 20 has a pump 22 fastened to a converter casing 21 secured to the output shaft 2, a turbine 23 facing to and driven by the pump 23, and a stator 25 disposed between the pump 23 and turbine 24 and installed to a transmission casing 11 through a one-way clutch 24. Rotation of the turbine 23 is transmitted to the transmission gear mechanism 30 through a hollow turbine shaft 27. The stator 25 multiplies engine torque. The torque converter 20 is equipped with a lockup clutch 26 between the converter casing 21 and turbine 23 which mechanically couples the turbine 23 and output shaft 2 together when the lockup clutch 26 is activated. The one-way clutch 24 permits rotation of the stator 24 in one direction in which an oil pump 13 rotates and, however, prevents it from rotating in the opposite or reverse direction. This oil pump 13 is connected to a pump shaft 12 extending through the turbine shaft 27 and connected to the engine output shaft 2.

The transmission gear mechanism 30 comprises a planetary gear having a small diameter of sun gear 31 installed to the turbine shaft 27, a large diameter of sun gear 32 mounted for rotation on the turbine shaft 27 and located on one side of the small sun gear 31 remote from the engine 1, a plurality of short pinion gears 33 in mesh with the small sun gear 31, a long pinion gear 34 having a half in mesh with the short pinion gear 33 and another half in mesh with the large sun gear 32, a pinion carrier 35 by which the pinion gears 33 and 34 for rotation, and a ring gear 19 in mesh with the long pinion gear 34.

Transmission gear mechanism 30 includes a number of frictional coupling elements, such as clutches and brakes. A forward clutch 41 and a first one-way clutch 51 are arranged in series between the turbine shaft 27 and the small sun gear 31. A coast clutch 42 is installed to the turbine shaft 27 in parallel with these forward clutch 41 and first one-way clutch 51. A ¾ clutch 43 is located between the turbine shaft 27 and the pinion carrier 35. A reverse clutch 44 is located between the turbine shaft 27 and large sun gear 32. Further, a ⅔ brake 45 is located between the large sun gear 32 and reverse clutch 44. This ⅔ brake 45 is of a type having a brake band for braking the large sun gear 32. A second one-way clutch 52 and a low/reverse brake 46 are located in parallel between the pinion carrier 35 and the transmission casing 11. The second one-way clutch 52 receives reaction force from the pinion carrier 35. The low/reverse brake 46 brakes the pinion carrier 35. On one side of the ¾ clutch 43 closer to the engine there is an output gear 14 connected to the ring gear 36 through which driving force is transmitted to driving wheels through a differential (not shown).

The transmission gear mechanism 10 itself provides four forward gears and a reverse gear by selectively locking and unlocking the friction coupling elements, in particular the clutches 41, 42, 43 and 44, and the brakes 45 and 46 as shown in Table in FIG. 2.

Figure 3:
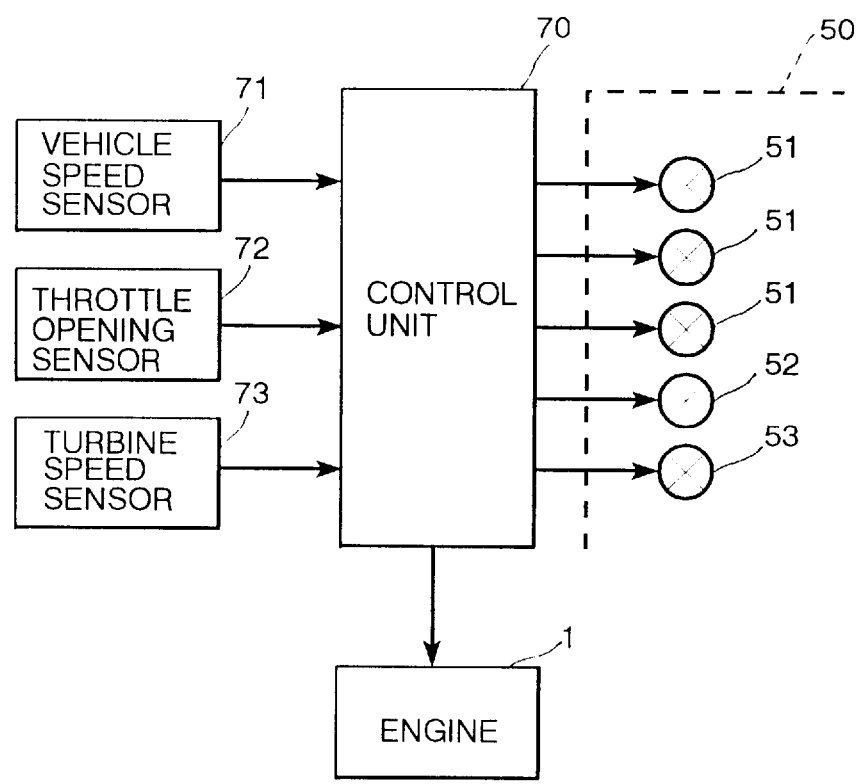
FIG. 3 is a table of activated friction coupling elements for possible gears of the automatic transmission.

As shown in FIG. 3, the automatic transmission 10 has a hydraulic control circuit 50 for controlling locking pressure with which the friction coupling elements 41–46 are selectively locked and unlocked according to various patterns shown in Table in FIG. 2. The hydraulic control circuit 50 includes various solenoid valves, namely gear shift valves 51, a lockup control valve 52, and a line pressure control valve 53.

Control unit 70 governs various controls of the automatic transmission, including gear shift control, lockup control and hydraulic pressure control as well as the torque down control. This control unit 70 receives signals representative various control parameters and generates and sends control signals to the solenoid valves 51, 52 and 53 based on these control parameters. Signals include at least a vehicle speed signal from a speed sensor 71, a throttle opening signal from a throttle position sensor 72, a turbine speed signal from a speed sensor 73.

In order to prevent shift shock, the control unit 70 provides a torque down command signal of specified duration during a gear shift. During the presence of a torque down command signal, the engine 1 is controlled to drop its output torque by, for example, retarding ignition timing or shutting off a part of cylinders from fuel delivery.

Figure 4:
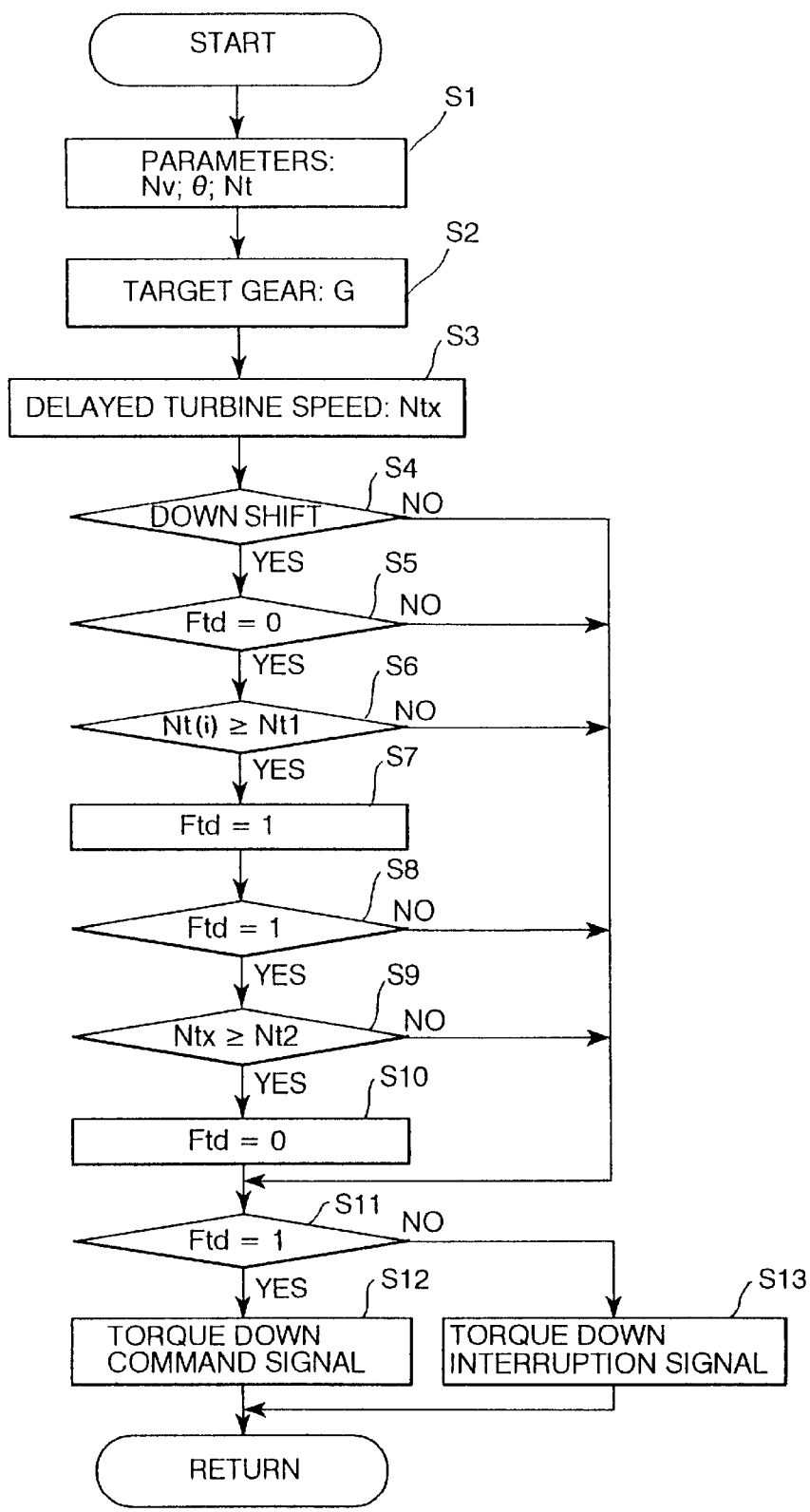
FIG. 4 is a flow chart illustrating a torque down control sequential routine.

Referring to FIG. 4, which is a flow chart illustrating a sequential routine of the torque down control during a down-shift, the flow chart logic commences and control passes directly to a function block at step S1 where control parameters, namely vehicle speed Nv, throttle opening Tθ and turbine speed Nt which is referred to input speed to the automatic transmission, are read in based on signals from the sensors 71, 72 and 73, respectively. Subsequently, on the basis of these control parameters, a target gear G is determined at step S2.

At step S3, the restrained turbine speed Ntx is translated by use of the formula (I).

$$Ntx = [Nt(i) + Nt(i-1) + Nt(i-2) + Nt(i-3) + Nt(i-4)]/5 \qquad (I)$$

As apparent from the formula (I), the restrained turbine speed Ntx is given as an average speed of the latest practical speed monitored in the latest five intervals. This formula provides the restrained turbine speed that is drawn more closer to the practical turbine speed as the changing rate of practical turbine speed decreases. In other words, the delay in termination of the torque down control from a conclusion of a down shift is shortened more as the changing rate of practical turbine speed decreases.

Subsequently, a determination is made at step S4 as to whether a down-shift is being caused. When the answer to the decision is "YES", another determination is made at step S5 as to whether a torque down flag Ftd is in a state of "0". When the answer to the decision is "YES," this indicates that the torque down control is not yet started, then, a determination is made at step S6 as to whether the latest practical turbine speed Nt(i) is equal to or greater than a first reference turbine speed Nt1. When the latest practical turbine speed Nt(i) has reached or exceeded the first reference turbine speed Nt1, the torque down flag Ftd is set to a state of "1" at step S7. The first reference turbine speed Nt1 is defined as a function of a type of gear shift and a vehicle speed.

Thereafter, a determination is made at step S8 as to whether the torque down flag Ftd has been set to the state of "1". When the torque down flag Ftd has changed to the state of "1," a determination is made at step S9 as to whether the restrained turbine speed Ntx is equal to or greater than a second reference turbine speed Nt2. This second reference turbine speed Nt2 is defined as a function of a type of gear shift and a vehicle speed similarly to the first reference turbine speed Nt1 and, however, established as a speed slightly less than a turbine speed after a conclusion of the gear shift. When the restrained turbine speed Ntx has exceeded the second reference turbine speed Nt2, after setting the torque down flag Ftd to the state of "0" at step S10, a determination is made at step S11 as to whether the torque down flag Ftd has been changed to the state of "1". Based on the result of the determination, the control unit 70 sends to the engine 1 a torque down control command signal when the answer is affirmative at step S12 or a torque down control suspension signal when the answer is negative at step S13.

When the answer to any one of the determinations made at steps S4, S5, S6, S8 and S9 is "NO," the flow chart logic proceeds directly to the determination concerning the state of the torque down flag Ftd.

Figure 5:
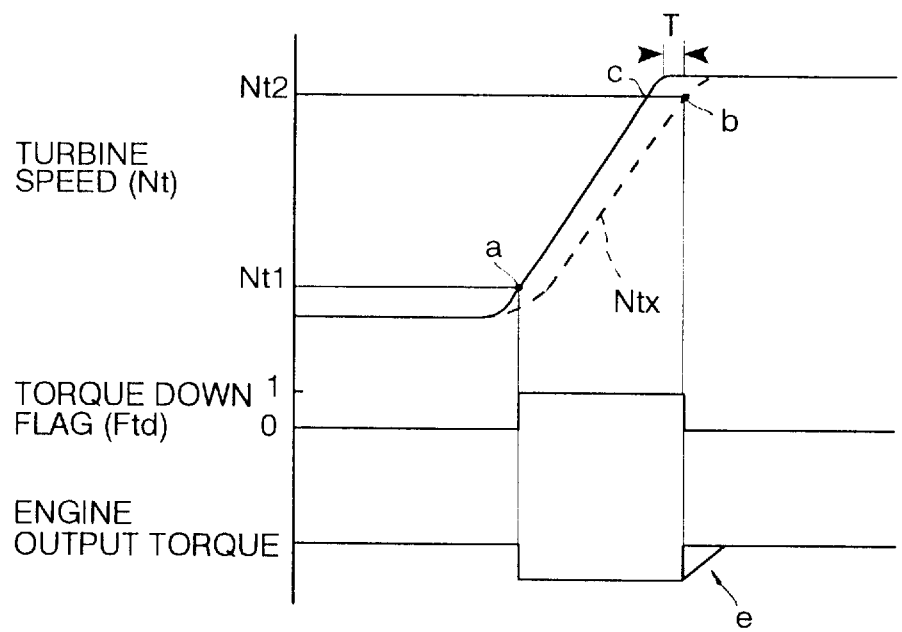
FIG. 5 is a time chart of the torque down control when a changing rate of turbine speed is small.
Figure 6:
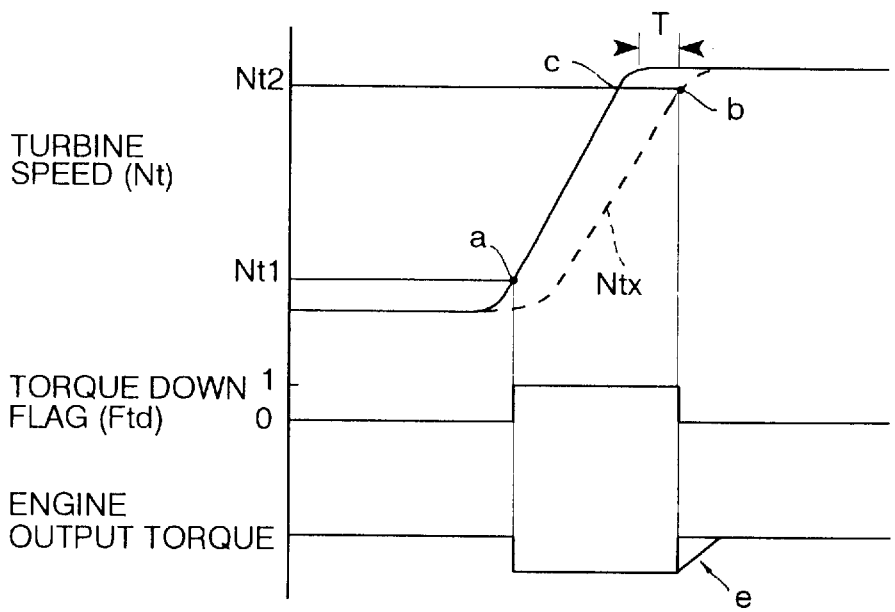
FIG. 6 is a time chart of the torque down control when a changing rate of turbine speed is small.

As shown in FIGS. 5 and 6, with the torque down control, the torque down flag Ftd remains set to the state of "1" for a period of time for which the turbine speed Nt changes from the first reference turbine speed NT1 to the second reference turbine speed NT2, permitting the engine 1 to drop its output torque. The restrained turbine speed Ntx experiences small restraint relative to the practical turbine speed Nt when the changing rate of the practical turbine speed Nt is relatively small (FIG. 5). Accordingly, a delay time T, which is defined as a time period from when the changing rate of the practical turbine speed Nt falls to zero resulting from a conclusion of the gear shift (at a point marked c) to when the restrained turbine speed Ntx exceeds over the second reference turbine speed Nt2 (at a point marked b), is relatively short. On the other hand, as shown in FIG. 6, the restrained turbine speed Ntx experiences large restraint relative to the practical turbine speed Nt when the changing rate of the practical turbine speed Nt is relatively large and, consequently, the delay time T is relatively long.

Accordingly, in any case, both disappearance time T2 necessary for fluctuations of the turbine speed or torsional vibrations resulting from reaction of locking the friction coupling element after a conclusion of a gear shift to disappear and delay time T change according to a change in turbine speed during the gear shift in correspondence to each other. Because the termination of the torque down control is extended until the delay time T has passed, the torque down control is timely terminated in always response to the disappearance of fluctuations of the turbine speed, yielding more effective control of turbine speed fluctuations.

Restrained turbine speed Ntx(i) may be calculated by use of the formula (II).

$$Ntx(i)=a-Nt(i)+b-Nt(i-1) \qquad (II)$$

where

Nt(i) is the turbine speed calculated in the latest control sequence routine;

Ntx(i-1) is the turbine speed calculated in the control sequence routine one cycle before;

a and b are constants and equal to 1 (one) in total.

With the formula (II), the restrained turbine speed Ntx is given as a total value of the latest two restrained turbine speeds apportioned at a specified rate and provides a decrease in the delay time T with a decrease in the changing rate of turbine speed Nt. Since the delay time T is increased as the constant a becomes smaller, it may be permitted to set the constant a to be smaller and the constant b to be larger for down shifts to lower gears, such as the first and second gear which take the disappearing time T2 of long duration than for down shifts to a higher gear such as the third gear.

Figure 7:
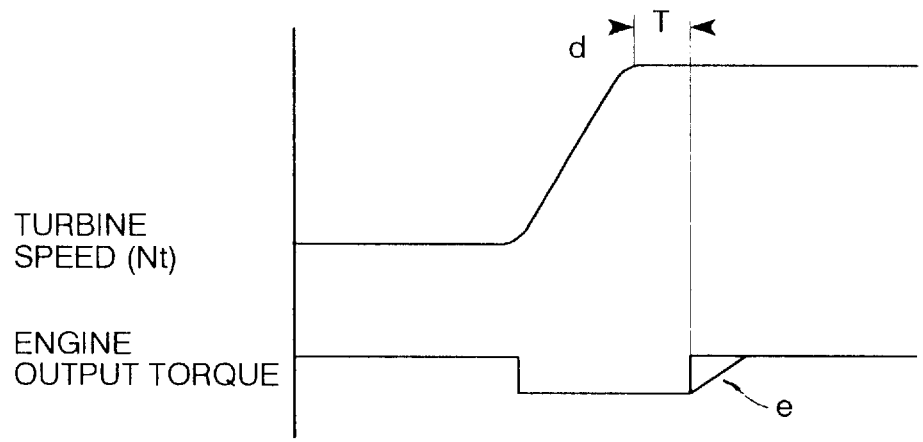
FIG. 7 is a flow chart illustrating a variation of the torque down control sequential routine.
Figure 8:
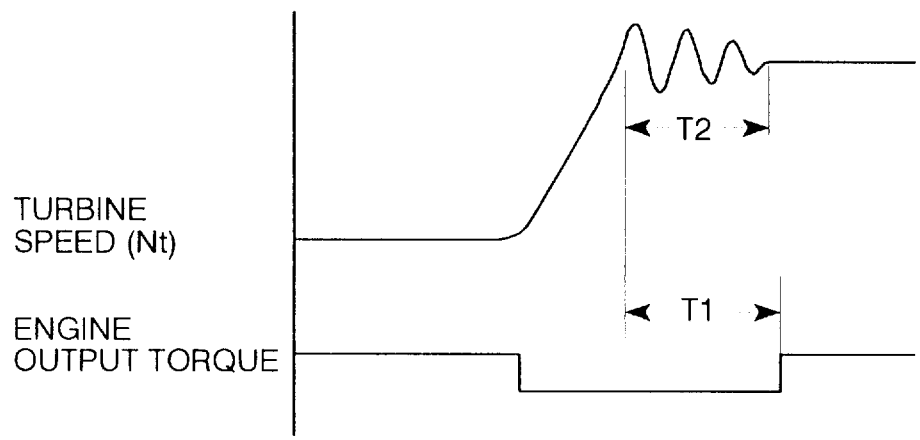
FIG. 8 is a time chart of torque down control for the purpose of explaining a problem encountered by the conventional control system.

The torque down control may be controlled by counting the delay time T from a conclusion of gear shift and termination of the torque down control by use of a timer in place of using the restrained turbine speed. Specifically, as shown in FIG. 7, while a point of time d at which the changing rate of turbine speed changes to zero is detected, the torque drop control is terminated at passage of a specified delay time T from the point of time d. In this case, the delay time T is set to a greater value when the changing rate of turbine speed during a gear shift is greater as compared with when it is smaller. With this torque drop control, the torque down control is timely terminated in always response to the disappearance of fluctuations of the turbine speed.

As marked e in FIGS. 5 to 7, the engine output torque may be gradually raised to the normal level with an effect of reducing shock due to a rapid increase in input torque to the automatic transmission 10.

The rotational speed of engine may be substituted for the rotational speed of turbine as a transmission input speed.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An automatic transmission control system for selectively actuating friction coupling elements to change a power transmission path of a transmission gear mechanism so as to thereby place an automatic transmission into desired gears and causing an engine to produce a drop of output torque during a down shift, said automatic transmission control system comprising:

speed monitoring means for monitoring a practical input speed of rotation transmitted to said transmission gear mechanism at regular intervals; and control means for changing said practical input speed of rotation to a restrained input speed of rotation defined by a specific relationship such that a difference between said practical input speed of rotation and said restrained input speed of rotation is greater for a higher changing rate than for a lower changing rate, and causing said engine to continuously produce a drop of output torque from said engine until said restrained input speed of rotation reaches a specified speed of rotation.

2. The automatic transmission control system as defined in claim 1, wherein said restrained input speed of rotation is given as an average input speed of rotation of at least input speed of rotation and a specific number of previous measurements on said practical input speed of rotation.

3. The automatic transmission control system as defined in claim 1, wherein said specific relationship is given by the following expression:

Ntx(1)=a·Nt(1)+b·Ntx(1−1)

where

Ntx(1) is the restrained input speed of rotation;

Nt(1) is the practical input speed of rotation monitored in an interval immediately before the present interval;

Ntx(1−1) is the restrained input speed of rotation monitored in an interval immediately before the present interval; and a and b are constants which total 1 (one).

4. An automatic transmission control system as defined in claim 3, wherein said constants a and b are varied according to types of down shifts.

5. The automatic transmission control system as defined in claim 4, wherein said constant b is set to a greater value when said down shift is made to a lower gear than when made to a higher gear.

6. The automatic transmission control system as defined in claim 1, wherein said control means stops said drop of output torque when said restrained input speed of rotation reaches said specified speed of rotation and causes said engine to gradually increase output torque.

7. An automatic transmission control system for selectively actuating friction coupling elements to change a power transmission path of a transmission gear mechanism so as to thereby place an automatic transmission into desired gears and causing an engine to produce a drop of output torque during a down shift, said automatic transmission control system comprising:

speed monitoring means for monitoring a practical input speed of rotation transmitted to said transmission gear mechanism at regular intervals; and control means for monitoring a changing rate of said practical input speed of rotation during a down shift, detecting conclusion of said down shift, causing said engine to stop said drop of output torque at a lapse of a specified period of time from said conclusion of said down shift, and setting said specified period of time longer for a higher said changing rate than for a lower said changing rate.

8. The automatic transmission control system as defined in claim 1, wherein said specified speed of rotation is different from said gears.

9. The automatic transmission control system as defined in claim 1, wherein said specified speed of rotation is different for vehicle speeds.

10. An automatic transmission control system for selectively actuating friction coupling elements to change a power transmission path of a transmission gear mechanism so as to thereby place an automatic transmission into desired gears and causing an engine to produce a drop of output torque during a down shift, said automatic transmission control system comprising:

speed monitoring means for monitoring a practical input speed of rotation transmitted to said transmission gear mechanism at regular intervals; and control means for changing said practical input speed of rotation such that a difference between said practical input speed of rotation and said restrained input speed of rotation defined as an average input speed of rotation of a latest practical input speed of rotation and a specified number of previous measurements on said practical input speed of rotation is greater for higher said changing rate than for lower said changing rate, and causing said engine to continuously produce a drop of output torque from said engine until said restrained input speed of rotation reaches a specified speed of rotation.

11. An automatic transmission control system for selectively actuating friction coupling elements to change a power transmission path of a transmission gear mechanism so as to thereby place an automatic transmission into desired gears and causing an engine to produce a drop of output torque during a down shift, said automatic transmission control system comprising:

a speed sensor for monitoring a practical input speed of rotation transmitted to said transmission gear mechanism at regular intervals; and a control unit for causing said engine to change output torque according to said practical input speed;

said control unit calculating a changing rate of said practical input speed of rotation during a down shift, detecting conclusion of said down shift based on said practical input speed of rotation, causing said engine to stop said drop of output torque at a lapse of a specified period of time from said conclusion of said down shift, and setting said specified period of time longer for a higher said changing rate than for a lower said changing rate.

* * * * *